(12) United States Patent
Stajner

(10) Patent No.: US 10,380,503 B2
(45) Date of Patent: Aug. 13, 2019

(54) DISTRIBUTED ONLINE LEARNING FOR PRIVACY-PRESERVING PERSONAL PREDICTIVE MODELS

(71) Applicant: HERE Global B.V., Veldhoven (NL)

(72) Inventor: Tadej Stajner, Berlin (DE)

(73) Assignee: HERE Global B.V., Eindhoven (NL)

( * ) Notice: Subject to any disclaimer, the term of this patent is extended or adjusted under 35 U.S.C. 154(b) by 687 days.

(21) Appl. No.: 15/094,292

(22) Filed: Apr. 8, 2016

(65) Prior Publication Data

US 2017/0293857 A1   Oct. 12, 2017

(51) Int. Cl.
| | | |
|---|---|---|
| *G06N 5/00* | (2006.01) | |
| *G06N 20/00* | (2019.01) | |
| *G06N 5/04* | (2006.01) | |
| *H04L 29/08* | (2006.01) | |
| *G01C 21/26* | (2006.01) | |
| *G01C 21/36* | (2006.01) | |
| *G06F 16/2458* | (2019.01) | |

(52) U.S. Cl.
CPC .............. *G06N 20/00* (2019.01); *G01C 21/26* (2013.01); *G01C 21/3617* (2013.01); *G01C 21/3685* (2013.01); *G01C 21/3697* (2013.01); *G06F 16/2458* (2019.01); *G06N 5/04* (2013.01); *H04L 67/10* (2013.01)

(58) Field of Classification Search
CPC ........ G60N 99/005; G06N 5/00; G06N 5/025; G06N 5/043; G06N 3/088
See application file for complete search history.

(56) References Cited

U.S. PATENT DOCUMENTS

| | | | | |
|---|---|---|---|---|
| 10,152,676 | B1* | 12/2018 | Strom .................... | G06N 20/00 |
| 2002/0091655 | A1* | 7/2002 | Agrafiotis ............ | G06K 9/6232 |
| | | | | 706/26 |
| 2011/0320767 | A1* | 12/2011 | Eren .................... | G06N 99/005 |
| | | | | 712/30 |

(Continued)

FOREIGN PATENT DOCUMENTS

WO    WO 2009/136230 A2    11/2009

OTHER PUBLICATIONS

European Patent Office, Extended European Search Report for Application No. 17165297.7, dated Aug. 8, 2017, 9 pages, Germany.

(Continued)

*Primary Examiner* — Hal Schnee
(74) *Attorney, Agent, or Firm* — Alston & Bird LLP

(57) ABSTRACT

Methods, apparatus, systems, and computer program products are provided for providing distributed online learning for personal predictive models that preserves user privacy. An example method comprises receiving model updates based at least in part on synchronization metadata. The model update comprises one or more received model parameter updates. The received model parameter updates correspond to one or more model parameters. The model updates are associated with a particular apparatus. The example method further comprises determining a decay factor based at least in part on the synchronization metadata; applying the decay factor to the one or more received model parameter updates; and updating the one or more model parameters based on the decayed model parameter updates.

20 Claims, 4 Drawing Sheets

(56) References Cited

U.S. PATENT DOCUMENTS

| | | |
|---|---|---|
| 2013/0242284 A1 | 9/2013 | Zeng |
| 2015/0242760 A1 | 8/2015 | Miao et al. |
| 2015/0324686 A1* | 11/2015 | Julian .................... G06N 20/00 |
| | | 706/25 |
| 2017/0091652 A1* | 3/2017 | Miao .................... G06N 99/005 |

OTHER PUBLICATIONS

De Sa, Christopher, et al., "Taming the Wild: A Unified Analysis of Hogwild!-Style Algorithms", Cornell University Online Library, Jun. 23, 2015 retrieved from <http://arxiv.org/pdf/1506.06438v1.pdf%20> on Sep. 20, 2016.

Dean, Jeffrey, et al., "Large Scale Distributed Deep Networks", Advances in Neural Information Processing Systems 25, 2012, pp. 1232-1240, retrieved from <http://machinelearning.wustl.edu/mlpapers/paper_files/NIPS2012_0598.pdf> on Sep. 20, 2016.

McDonald, Ryan, et al., "Distributed Training Strategies for the Structured Perceptron", Human Language Technologies: The 2010 Annual Conference of the North American Chapter of the ACL, Jun. 2010, pp. 456-464, retrieved from<http://www.cslu.ogi.edu/~bedricks/courses/cs506-pslc/articles/week3/dpercep.pdf> on Sep. 20, 2016.

Miao, Xu, et al., "Distributed Personalization", Proceeding KDD '15 Proceedings of the 21th ACM SIGKDD International Conference on Knowledge Discovery and Data Mining, Aug. 10-13, 2015, pp. 1989-1998, retrieved from <http://delivery.acm.org/10.1145/2790000/2788626/p1989-miao.pdf?ip=38.116.36.205&id=2788626&acc=OA&key=4D4702B0C3E38B35%2E4D4702B0C3E38B35%2E4D4702B0C3E38B35%2EB7E33E30320F15A7&CFID=840481121&CFTOKEN=39489959&_acm_=1474409121_f3abae82b784dea6f2e6c58fa60455a0> on Sep. 20, 2016.

Niu, Feng, et al., "Hogwild!: A Lock-Free Approach to Parallelizing Stochastic Gradient Descent", Jun. 2011, Advances in Neural Information Processing Systems 24, 2011, 22 pages, retrieved from <https://people.eecs.berkeley.edu/~brecht/papers/hogwildTR.pdf> on Sep. 20, 2016.

* cited by examiner

DISTRIBUTED ONLINE LEARNING FOR PRIVACY-PRESERVING PERSONAL PREDICTIVE MODELS

TECHNOLOGICAL FIELD

Example embodiments relate generally to distributed online learning. In particular, example embodiments generally relate to distributed online learning for privacy-preserving personal predictive models.

BACKGROUND

For various reasons, a user may have multiple apparatuses that are capable of providing personalized predictive services. For example, the predictive services may be based on learning supervised models that describe the user's behavior given historical data. The learning takes place on the apparatus itself, using data gathered on that apparatus. However, if a user possess or uses multiple such apparatuses, the apparatuses are exposed to different training data, which can cause divergent models. For example, if two apparatuses are given the same input, the two different apparatuses may provide different predictions based on the predictive model of that apparatus.

A typical solution to the divergent model problem is to establish a synchronization infrastructure for making all of the data accessible to all of the apparatuses. However, such a solution typically involves copying the data to a server, which exposes the user to privacy risks and imposes requirements on handling personal data to the server operator.

BRIEF SUMMARY

Methods, apparatus, systems and computer program products are provided in accordance with an example embodiment in order to provide distributed online learning for personalized predictive models that preserve a user's privacy. In example embodiments, model updates are received, for example, by a processor and through a communications interface, based at least in part on synchronization metadata. A decay factor is determined based at least in part on the synchronization metadata. The decay factor is applied to the one or more received model parameter updates. The one or more model parameters are updated based on the decayed model parameter updates.

In accordance with an example embodiment, a method is provided. The method comprises receiving model updates based at least in part on synchronization metadata. The model update comprises one or more received model parameter updates, the received model parameter updates correspond to one or more model parameters, and the model updates are associated with a particular apparatus. The method further comprises determining a decay factor based at least in part on the synchronization metadata; applying the decay factor to the one or more received model parameter updates; and updating the one or more model parameters based on the decayed model parameter updates.

In an example embodiment, the method further comprises collecting one or more data points, the one or more data points based at least in part on measurements made by one or more sensors; determining one or more determined model parameter updates based at least in part on the one or more data points; and updating the one or more model parameters based at least in part on the one or determined model updates. In an example embodiment, determining the one or more determined model parameter updates is based at least in part on a loss function, a regularization term, a learning rate function, and/or a combination thereof. In an example embodiment, the one or more model parameters are updated by an element wise addition of the one or more determined model parameter updates.

In an example embodiment, the synchronization metadata comprises information indicating a number of model update iterations completed by the particular apparatus since the last model update associated with the particular apparatus was received. In various embodiments, the decay factor applied to the received model parameter updates decreases monotonically as the number of model update iterations completed by the particular apparatus since received model updates associated with the particular apparatus were last received increases. In example embodiments, the decay factor is parameterized by a decay constant. In various embodiments, the method further comprises providing one or more determined model updates to the particular apparatus, the one or more determined model updates selected based on synchronization metadata indicating a model update iteration number for which a determined model update was last provided to the particular apparatus. In an example embodiment, the method further comprises storing synchronization metadata indicating a most recent model update iteration number for which a determined model update has been provided to the particular apparatus, the most recent model update iteration number being stored in association with an identifier configured to identify the particular apparatus. In example embodiments, the one or more model parameters comprise one or more parameters of a predictive model and/or a default prediction.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive model updates based at least in part on synchronization metadata. The model update comprises one or more received model parameter updates, the received model parameter updates correspond to one or more model parameters, and the model updates are associated with a particular apparatus. The at least one memory and the compute program code are further configured to, with the processor, cause the apparatus to at least determine a decay factor based at least in part on the synchronization metadata; apply the decay factor to the one or more received model parameter updates; and update the one or more model parameters based on the decayed model parameter updates.

In an example embodiment, the at least one memory and the computer program code are further configured to, with the processor, cause the apparatus to at least collect one or more data points, the one or more data points based at least in part on measurements made by one or more sensors; determine one or more determined model parameter updates based at least in part on the one or more data points; and update the one or more model parameters based at least in part on the one or determined model updates. In an example embodiment, the one or more model parameters are updated by an element wise addition of one or more determined model parameter updates. In an example embodiment determining the one or more determined model parameter updates is based at least in part on a loss function, a regularization term, a learning rate function, or a combination thereof.

In an example embodiment the synchronization metadata comprises information indicating a number of model update iterations completed by the particular apparatus since the last model update associated with the particular apparatus was received. In an example embodiment the decay factor applied to the received model parameter updates decreases monotonically as the number of model update iterations completed by the particular apparatus since received model updates associated with the particular apparatus were last received increases. In an example embodiment, the at least one memory and the computer program code are further configured to, with the processor, cause the apparatus to at least provide one or more determined model updates to the particular apparatus. The one or more determined model updates are selected based on synchronization metadata indicating a model update iteration number for which a determined model update was last provided to the particular apparatus. In an example embodiment, the at least one memory and the computer program code are further configured to, with the processor, cause the apparatus to at least store synchronization metadata indicating a most recent model update iteration number for which a determined model update has been provided to the particular apparatus, the most recent model update iteration number being stored in association with an identifier configured to identify the particular apparatus.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive model updates based at least in part on synchronization metadata, wherein (a) the model update comprises one or more received model parameter updates, (b) the received model parameter updates correspond to one or more model parameters, and (c) the model updates are associated with a particular apparatus; determine a decay factor based at least in part on the synchronization metadata; apply the decay factor to the one or more received model parameter updates; and update the one or more model parameters based on the decayed model parameter updates.

In accordance with yet another example embodiment of the present invention, an apparatus is provided. The apparatus comprises means for receiving model updates based at least in part on synchronization metadata. The model update may comprise one or more received model parameter updates, the received model parameter updates correspond to one or more model parameters, and the model updates are associated with a particular apparatus. The apparatus may comprise means for determining a decay factor based at least in part on the synchronization metadata. The apparatus may comprise means for applying the decay factor to the one or more received model parameter updates. The apparatus may further comprise means for updating the one or more model parameters based on the decayed model parameter updates.

BRIEF DESCRIPTION OF THE DRAWINGS

Figure 1:
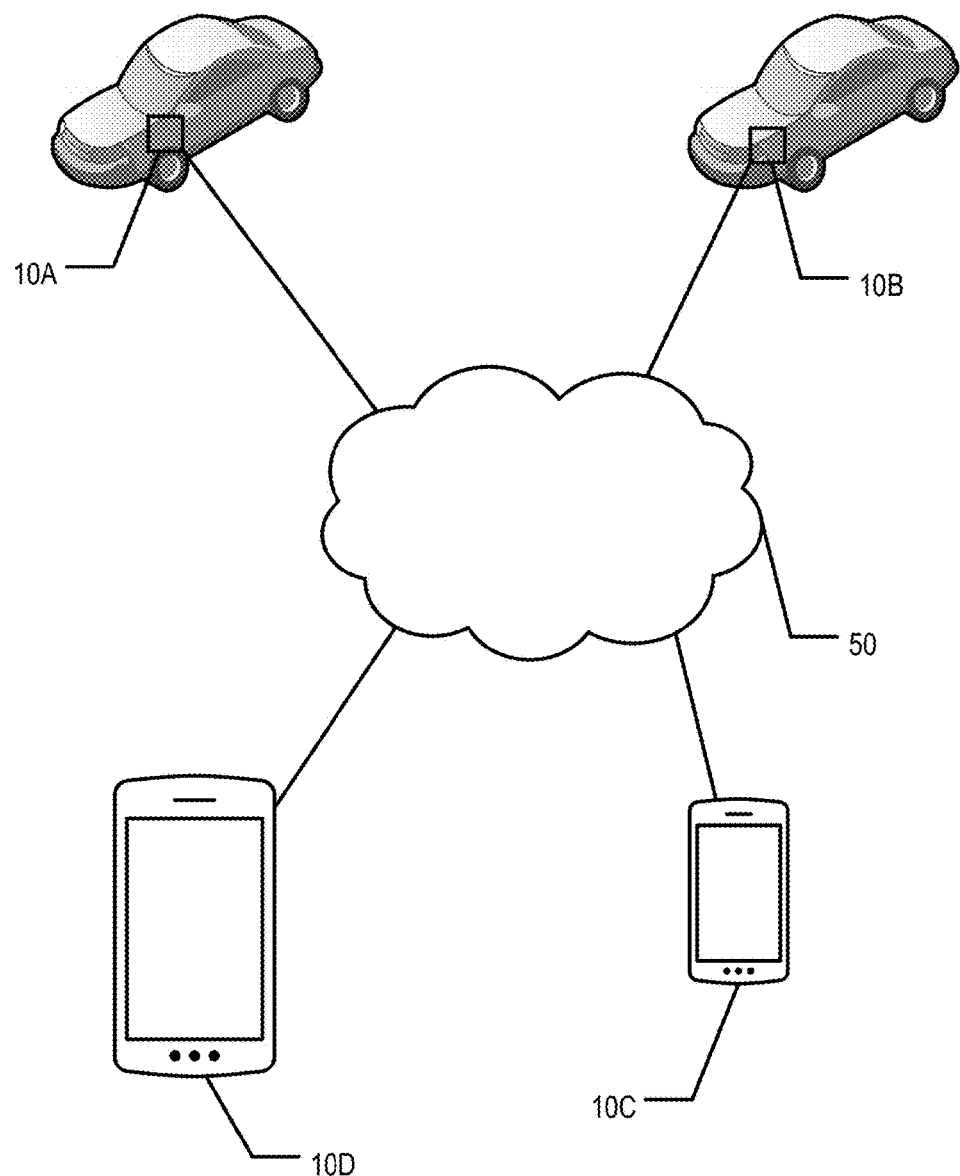
Figure 2:
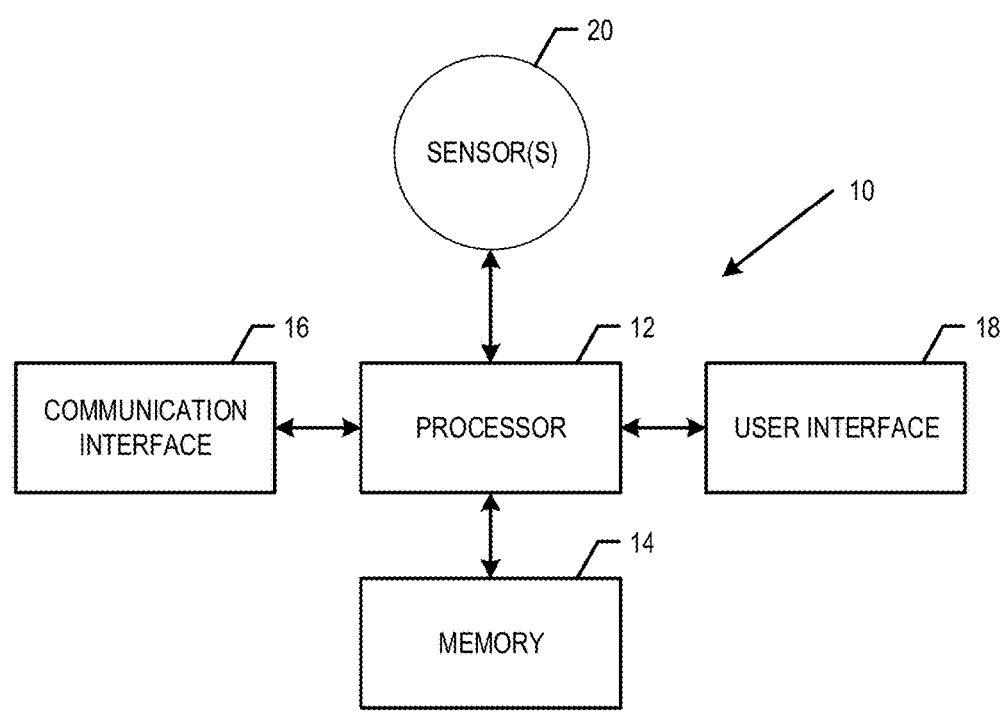
Figure 3:
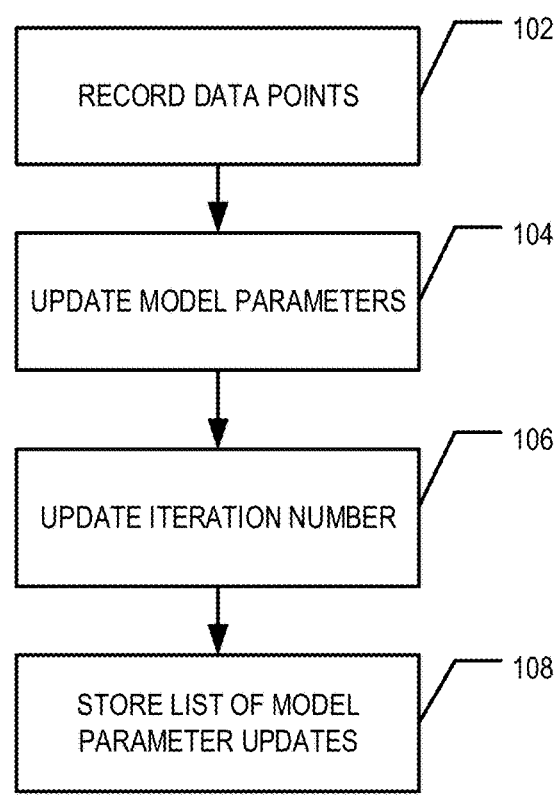
Figure 4:
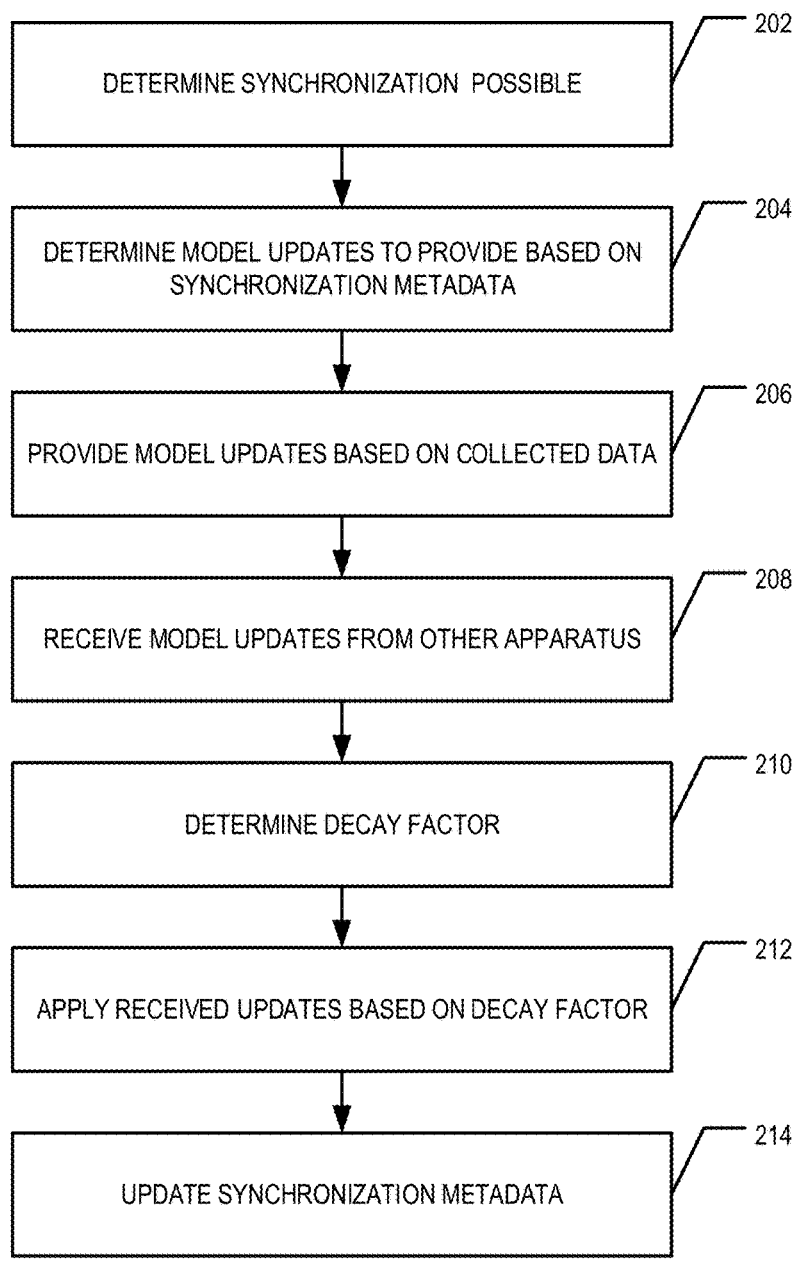

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2 is a block diagram of an apparatus that may be specifically configured in accordance with an example embodiment;

FIG. 3 is a flowchart illustrating operations performed, such as by the apparatus of FIG. 2, to update a model based on collected data, in accordance with an example embodiment; and FIG. 4 is a flowchart illustrating operations performed, such as by the apparatus of FIG. 2, to synchronize models learning on different apparatuses, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide distributed online learning for personal predictive models that preserves users' privacy. For example, in an embodiment, a personal predictive model may be configured to predict a user's destination based on the user's current location and the time of the week. The user may have multiple apparatuses that each gather data points and update a model on that apparatus based on the data points. Different apparatuses may gather different data. For example, if the user uses a vehicle share, the user may drive several different vehicles over the course of a few weeks and each vehicle the user drove will have collected different data points. Thus, the model determined by one apparatus may differ from the model determined by another apparatus. Therefore, it would be helpful to share model information/data between apparatuses such that the personal predictive model on a particular apparatus may have the benefit of learning from as many data points as possible.

When sharing model information/data, it is important to preserve a user's privacy. For example, in various jurisdictions there may be laws against sharing of various types of data. In example embodiments, in order to protect a user's privacy, model updates determined based on collected data may be shared rather than the data points themselves. For example, when an apparatus collects new data, the model on that apparatus is updated. The model update may be saved and provided to one or more other apparatuses as synchronization with other apparatuses becomes available.

In various embodiments, two apparatuses may go a significant amount of time between synchronization events. During this time, the models on the two apparatuses may gather different data and the models may diverge. For example, given the same input, the models on the two different apparatuses may provide different predictions due to the different data points collected by the two apparatuses since the apparatuses were last synchronized. When the first apparatus receives the model updates from the second apparatus, the model on the first apparatus may be updated in a manner than overcorrects the model on the first apparatus. Thus, updating the model on the first apparatus may actually cause the model to be less accurate.

According to the present invention, over correction of a model is prevented by weighting each model parameter update by a decay factor. In example embodiments, the decay factor decreases monotonically with the increasing number of model updates between when two apparatuses last had a synchronization event. For example, if apparatus $10j$ has had 10 iterations of the model since last synchronizing with apparatus $10i$ and apparatus $10k$ has had 5 iterations of the model since last synchronizing with apparatus $10i$, the model parameter updates received from apparatus $10j$ will be more decayed than the model parameter updates received form apparatus $10k$.

FIG. 1 provides an illustration of an example system that can be used in conjunction with various embodiments of the present invention. As shown in FIG. 1, the system may include multiple apparatuses 10 (e.g., 10A, 10B, 10C, 10D) which may communicate with another apparatus 10 (e.g., 10A, 10B, 10C, 10D) through one or more wired or wireless networks 50. In various embodiments, an apparatus 10 may be on board a vehicle (e.g., 10A, 10B), a cellphone (e.g., 10C), or a tablet or other mobile device (e.g., 10D). For example, the vehicle may be a motor vehicle, non-motor vehicle car, scooter, truck, van bus, motorcycle, bicycle, Segway, golf cart, and/or the like. In example embodiments, each apparatus 10 may comprise components similar to those shown in the example apparatus 10 diagramed in FIG. 2. Each of the components of the system may be in intermittent electronic communication with, for example, one another over the same or different wireless or wired networks including, for example, a wired or wireless Personal Area Network (PAN), Local Area Network (LAN), Metropolitan Area Network (MAN), Wide Area Network (WAN), cellular network, Bluetooth or other short range network, and/or the like. For example, apparatus 10A may exchange one or more model updates and/or other information/data intermittently with apparatus 10B via a network 50 during a synchronization event.

In example embodiments, an apparatus 10 may comprise a processor 12, memory 14, a user interface 18, a communications interface 16, one or more sensors 20, and/or other components configured to perform various operations, procedures, functions or the like described herein and as illustrated in FIG. 2. For example, the one or more sensors 20 may comprise an accelerometer, location sensor, clock, GPS sensor, odometer, barometer, thermometer, passenger sensor, and/or the like. Besides sensor for physical quantities, we also consider indicators of user activity as sensor inputs: for instance, indicating that the user is using a particular function of the apparatus, or accessing a particular media resource. For the purpose of the definition of a 'sensor input', we also considered derived inputs, obtained by processing one or more raw sensor inputs, such as performing sensor fusion of an odometer, accelerometer and GPS in order to determine the location as a single final sensor input. Example embodiments of an apparatus 10 are described in more detail below.

II. Exemplary Operation

As described above, example embodiments of the present invention provide for a distributed online learning model that preserves a user's privacy. In example embodiments, the model may be a personal predictive model. For example, the model may be configured to provide a prediction based on a multiple classification problem, such as predicting a user's destination or predicting a user's preferred radio station or other media source. For example, an apparatus 10 may track a user's location to determine a target variable of the user's destination. To do so, the apparatus 10 may use prediction features of the current location, the previous location, time, distances to other locations, and/or the like. To predict a target variable of a media source recommendation (e.g., a song, radio station, podcast, album, playlist, and/or other media source), the apparatus 10 may note the user's media selections and use prediction features of the estimated trip length, time of day, current place, number of passengers, and/or the like. In another example, the model may be configured to provide a prediction based on a regression problem, such as predicting a personalized estimated time of arrival, a personalized human driving profile (e.g., a comfortable velocity estimation), common user interface actions (e.g., learn context dependent favorite user interface shortcuts). For example, the model may predict a target variable of an estimated time of arrival (ETA) correction by using prediction features of road element features, road geometry, time, traffic, weather, and/or the like. In another example, the model may predict a target variable of a driving speed based on prediction features such as road element features, road geometry, time, traffic, weather, and/or the like. In yet another example, the model may predict a target variable of a user interface action button relevance by using prediction features including part-of-trip, time, user interface screen context, and/or the like. In another example, the model may be configured to provide a prediction based on a binary classification problem, such as a departure prediction. For example, the model may predict a target variable of departure or no departure based on prediction features such as current location, the previous location, time, distances to other locations, and/or the like. Other examples of possible models include a fuel station recommendation model, a parking spot recommendation model, a model for predicting optimal personalized suspension and vehicle dynamics settings, a predictive text entry model, automatic speech recognition model, and/or the like.

In various embodiments, the apparatus 10 is configured to perform an action based on the prediction provided by the model. For example, the apparatus 10 may collect a model input data point or predictive features. For example, a user may get into a vehicle and the vehicle may determine the location of the user and the time of the week and provide that information/data to the model to determine a destination prediction. The apparatus may then perform one or more actions based on the prediction provided by the model. For example, the apparatus 10 may display (e.g., through a user interface 18 thereof) a predicted destination, warnings or hazards along the route to the predicted destination, a fuel station recommendation, an expected time of arrival, a parking place recommendation, and/or the like. In another example, the apparatus 10 may change and/or control a component of a vehicle or the like based on the model prediction. For example, the apparatus 10 may cause the radio/media player of a vehicle to play a particular radio station or media type at a particular volume and/or with particular audio system settings. In another example, the apparatus 10 may personalize the suspension and/or vehicle dynamics settings of a vehicle based on the model prediction. Thus, it should be understood that apparatus 10 may perform or cause various actions to be performed based on a prediction provided by the model.

The models are configured to learn based on data points collected by the apparatus 10 the model is resident upon. For example, the model may learn by updating the model using determined model updates that are based on data collected by a first apparatus 10 (e.g., 10A). The models may be further configured to learn based on model updates received from other apparatuses. For example, the model may learn by updating the model using received model updates that are received from a second apparatus (e.g., 10B). For example the second apparatus (e.g., 10B) may collect data points and determine model updates for the model resident upon the second apparatus. The first apparatus may receive the model updates from the second apparatus and update the model resident on the first apparatus based on the model updates received from the second apparatus. These two methods of learning will now be described in more detail.

Model Learning Through Data Collection

FIG. 3 provides a flowchart illustrating how a model may be updated based on collected data, in accordance with example embodiments. For example, one or more sensors 20 of the apparatus 10 may collect one or more data points. Determined model updates may then be determined based on the one or more collected data points and the model on that apparatus 10$i$ may be updated accordingly. Each model update may be assigned a model update iteration number $t_j$ indicating the number of times the model of the apparatus 10$i$ has been updated.

Starting at block 102, one or more data points may be collected. For example, the apparatus 10 may collect one or more data points. For example, the apparatus 10 may comprise sensor(s) 20, processor 12, memory 14, and/or the like, configured for collecting one or more data points. For example, the data points may correspond and/or be associated with one or more models.

At block 104, one or more model parameters may be updated. For example, the apparatus 10 may update one or more model parameters. For example, the apparatus 10 may comprise processor 12, memory 14, and/or the like, configured to update one or more model parameters.

In example embodiments, a model may comprise metadata, model parameters, synchronization metadata, and/or the like. For example, the model may comprise metadata comprising the name of the class(es) or quantity that the model is configured to predict, a model identifier configured to identify the model, and/or the like. The model may further comprise a vector of model parameters $\theta_i$, where i indicates that the model is resident on the apparatus 10$i$. In the example of a linear model, the vector of model parameters $\theta_i$ comprises a vector of model coefficients $W_i=(W_{i0}, W_{i1}, \ldots)$ and a scalar value $b_i$. In example embodiments, $W_i$ is a vector of real numbers and scalar value $b_i$ is a real number.

For example, the scalar value $b_i$ may be a default prediction value. The model may further comprise synchronization metadata. For example, the synchronization metadata may comprise a current iteration number $t_j$.

In an example embodiment, updating the model parameters may comprise computing or determining model parameter updates $\Delta\theta_{ti}$ for the vector of model parameters $\theta_i$, where $\Delta\theta_{ti}$ is the update of vector $\theta_i$ for iteration number t. In the example of a linear model, the model parameter updates for iteration number $t_i$ may be $\Delta W_{ti}=(\Delta W_{ti0}, \Delta W_{ti1}, \ldots)$ and $\Delta b_{ti}$. In example embodiments, updating the model parameters may comprise a piece-wise addition of the components of the vector of model parameters $\theta_i$ and the determined model parameter updates $\Delta\theta_{ti}$. For example, the updated model parameter is updated as $W_{i0} \leftarrow W_{i0}+\Delta W_{ti0}$ and $\theta_i \leftarrow \theta_i+\Delta\theta_{ti}$.

In various embodiments, the model parameter updates $\Delta\theta_{ti}$ may be determined based on a stochastic gradient descent method. In various embodiments, the model parameter updates $\Delta\theta_{ti}$ may be determined based on a loss function, a regularization term, a learning rate function, one or more other functions, and/or a combination thereof. In various embodiments, a loss function $L(y, f(x))$ may be configured to measure model (mis)fit given the training data, wherein y is the truth value and/or actual outcome of a particular situation, f(x) is the linear scoring function and provides a prediction of the particular situation, and x is a vector of prediction features (e.g., the model input). For example x may be the measured input for the particular situation (e.g., time of the week, current location, etc.). For example, $L(y, f(x))$ may describe how similar the prediction provided by the linear scoring function f(x) is to the truth value y. In an example embodiment, the linear scoring function may be described as $f(x)=W^T x+b$. In various embodiments, the regularization term R(W) may be configured to penalize model complexity. In various embodiments, the learning rate function $\eta(t)$ may describe how fast the model adapts to new observations given the iteration number t, which describes the total number of data points observed so far by that particular apparatus 10. For example, the learning rate function $\eta(t)$ controls the step-size of the model updates in the parameter space. In example embodiments, the model parameter update may be configured to minimize the regularized training error. For example, in some embodiments, the regularized training error E(W, b) may be described as $$E(W, b) = \frac{1}{N}\sum_{k=1}^{N} L(y_k, f(x_k)) + \alpha R(W),$$

where $\alpha>0$ is a non-negative hyper-parameter. In particular, $\alpha$ may be configured to ensure the model parameters do not overfit the data. Thus, in example embodiments having a linear model, the model parameter update may be described as $$\Delta W = -\eta\left(\alpha\frac{\partial R(W)}{\partial W} + \frac{\partial L(y, W^T x+b)}{\partial W}\right)$$

and $$\Delta b = -\eta\left(\frac{\partial L(y, W^T x+b)}{\partial W}\right).$$

In some embodiments, the learning rate function may be described as $$\eta(t) = \frac{\eta_0}{t^p},$$

where $\eta_0$ is the base learning rate and $p>0$ is a non-negative real number. By decreasing the learning rate as the iteration number t gets large, convergence may be assured.

It should be understood that a variety of methods may be used to determine model parameter updates and update the model parameters accordingly. The examples described above are provided as illustrative examples.

At block 106, the iteration number may be updated. For example, the apparatus 10 may update the iteration number. For example, the apparatus 10 may comprise a processor 12, memory 14, and/or the like for updating the iteration number. For example, the current iteration number may be incremented by one and/or updated as $t_i \leftarrow t_i+1$.

At block 108, a list of model parameter updates are stored. For example, the apparatus 10 may store a list of model parameter updates. For example, the apparatus 10 may comprise a processor 12, memory 14, and/or the like for storing a list of model parameter updates. For example, a list of model parameter updates $\Delta\theta_{ti}$ are stored. In some embodiments the model parameter updates are stored for each iteration number $t_i$. In some embodiments, up to n model parameter updates are stored. For example, the model parameter updates $\Delta\theta_{(t-n+1)i}, \Delta\theta_{(t-n+2)i}, \ldots, \Delta\theta_{ti}$ are stored. In example embodiments, the list of model parameter updates may be stored such that the model parameter updates may be provided to another apparatus 10.

In the update procedure described above with respect to FIG. 3, the model may be a binary classification or a regression model. For example, for a linear binary classification or regression model, we have $f(x)=W^T x+b$, where W is a k-dimensional vector, k corresponding to the number of prediction features, x is a k-dimensional predictive feature vector, and b is a scalar. In the case of a regression model, the prediction or target variable $\hat{y}$ of the model may be obtained by $\hat{y}=f(x)$. In the case of a binary classification model, the prediction $\hat{y}$ of the model may be obtained by $\hat{y}=\text{sign}(f(x))$, where $-1$ and $1$ represent the negative and positive class respectively.

In various scenarios, the model may be a multi-class model. In various such embodiments, the multi-class problem addressed by the multi-class model may be posed as a set of binary classification problems where items of a particular class count as positive examples for that particular class and all other items counts as negative examples for that particular class. For example, the problem may be posed using a one-versus-all strategy. For example, the multi-class model may have k features and m different classes. In this example, W becomes a k by m dimensional matrix and the scalar b becomes an m-dimensional vector B. The predictive feature vector x remains a k-dimensional input vector. In such example embodiments, the linear scoring function f(x) becomes $f_{multi}(x)=Wx+B$, resulting in an m-dimensional vector. The resulting class (e.g., the prediction result) may be obtained by taking the index of the highest-scoring class. For example, the classification prediction $\hat{y}$ may be obtained by $\hat{y}=\arg\max_{\{i \in 0 \ldots m\}} f_{multi}(x)$.

It should be understood that in various embodiments, various machine learning techniques may be used to update a model based on determined model updates.

Synchronization

Embodiments of the present invention are configured to provide a distributed learning model. In particular, a plurality of apparatuses may have a model resident thereon that is configured to learn based on data collected by that apparatus. The model updates may be provided to other apparatuses of the plurality of apparatuses during synchronization events, such that the model on each apparatus may learn based on data collected by the other apparatuses without the actual data ever being provided by the collecting apparatus. In example embodiments, a model may comprise synchronization metadata. As noted above, the synchronization metadata may comprise a current iteration number $t_i$. The synchronization metadata may further comprise an iteration number of last synchronization to apparatus 10*i* for every other known device 10*j*. For example, the iteration number of the model on apparatus 10*i* at the last synchronization event between apparatus 10*i* and 10*j* may be the iteration number of last synchronization $T_{ij}$.

FIG. 4 is a flowchart illustrating operations performed to synchronize models learning on different apparatuses, in accordance with example embodiments. Starting at block 202, it is determined that a synchronization event may be possible. For example, apparatus 10*i* may determine that apparatus 10*i* can communicate with apparatus 10*j* (e.g., through network 50), and may therefore determine that a synchronization event may be possible. For example, the apparatus 10*i* may comprise a processor 12, memory 14, and/or the like for determining that a synchronization event with apparatus 10*j* is possible. For example, it may be determined that apparatus 10*i* is able to communicate with apparatus 10*j* through a wired or wireless Personal Area Network (PAN), Local Area Network (LAN), Metropolitan Area Network (MAN), Wide Area Network (WAN), cellular network, Bluetooth or other short range network, and/or the like. A communication session between apparatus 10*i* and apparatus 10*j* may be established (e.g., through the communication interface 16 of each apparatus, network 50, and/or the like).

At block 204, the model updates to be provided by apparatus 10*i* to apparatus 10*j* are determined based on the synchronization metadata. For example, the apparatus 10*i* may determine the model updates to provide to apparatus 10*j* based on the synchronization metadata. For example, the apparatus 10*i* may comprise a processor 12 and/or the like for determining the model updates to provide to apparatus 10*j*. For example, if the iteration number for apparatus 10*i* at the last synchronization event with apparatus 10*j* is $T_{ij}=10$, and the current iteration number for apparatus 10*i* is $t_i=15$, apparatus 10*i* may determine that the model updates for $t_i=11, 12, 13, 14,$ and $15$ should be provided to apparatus 10*j*. In embodiments, where a maximum of n model updates are stored, if the difference between $t_i$ and $T_{ij}$ is greater than n, then all n of the model updates stored by apparatus 10*i* may be provided to apparatus 10*j*.

At block 206, the determined model updates are provided. For example, the apparatus 10*i* may provide the determined model updates to apparatus 10*j*. For example, the apparatus 10*i* may comprise a processor 12, communications interface 16, and/or the like for providing the determined model updates to apparatus 10*j*. For example, apparatus 10*i* may provide model parameter updates $\Delta\theta_{(t-T+1)i}, \Delta\theta_{(t-T+2i)}, \ldots, \Delta\theta_{ti}$ to apparatus 10*j*. For example, each model update may comprise model metadata (e.g., a model identifier), one or more model parameter updates, an iteration number t corresponding to each model parameter update, and/or the like.

At block 208, model updates are received. For example, the apparatus 10*i* may receive model updates provided by apparatus 10*j*. For example, the apparatus 10*i* may comprise a processor 12, communications interface 16, and/or the like for receiving model updates provided by apparatus 10*j*. For example, the apparatus 10*i* may receive model updates provided by apparatus 10*j* comprising one or more model parameter updates Δθ$_{ti}$. In example embodiments, the model update comprises one or more received model parameter updates. The received model parameter updates may correspond to one or more model parameters. The model updates may be associated with the apparatus 10*j* that provided the updates.

In example embodiments, it may be determined (e.g., by apparatus 10*i*) if a model corresponding to the received model parameter updates Δθ$_{ti}$ is present on apparatus 10*i*. If a model corresponding to the received model parameter updates Δθ$_{ti}$ is not present on apparatus 10*i*, a corresponding model may be initiated. For example, the apparatus 10*i* may initiate a model θ$_i$=θ. For example, the model coefficients W$_i$=[0, 0, . . . , 0] and the scalar value b$_i$=0. If the model corresponding to the received model parameter updates Δθ$_{ti}$ is a multi-classification model, it may be determined (e.g., by apparatus 10*i*) if each of the classes present in the received model parameter updates Δθ$_{ti}$ are present in the multi-classification model resident on apparatus 10*i*. If a class that is present in the received model parameter updates Δθ$_{ti}$ is not present in the model resident on apparatus 10*i*, the new class may be initiated and the metadata may be updated to include the new class name for the model resident on apparatus 10*i*. For example, the apparatus 10*i* may define an new model coefficient matrix W'$_i$, which may be the previous model coefficient matrix W$_i$ with a row of zeroes added corresponding to the new class. The apparatus 10*i* may also add the new class name to the model metadata.

At block 210, a decay factor for the received model parameter updates is determined. For example, the apparatus **10*i* may determine a decay factor for the one or more received model parameter updates. For example, the apparatus 10*i* may comprise a processor 12 and/or the like for determining a decay factor for the received model parameter updates. For example, the decay factor may decrease monotonically as the range between T$_{ij}$ and t$_j$ increases. For example, if the received model parameter updates comprise two iterations of model parameter updates, the decay factor for the received model parameter updates will be closer to one than if the received model parameter updates comprised five iterations of model parameter updates. For example, if the difference t$_j$−T$_{ij}$ is small, a small number of iterations of the model have occurred since apparatus 10*i* and apparatus 10*j*** last had a synchronization event and accordingly the two models are expected to only have a small divergence. Thus, the smaller the different t$_j$−T$_{ij}$ is, the closer to unity the decay factor is. In an example embodiment, the decay factor d$_{ij}$ may be described as d$_{ij}$=exp(−λ(t$_j$−T$_{ij}$)), where λ is the decay parameter.

At block 212, the received parameter updates Δθ$_{tj}$ are applied to the model parameters θ$_i$ based on the corresponding decay factor. For example, the model parameters for the model resident on apparatus **10*i* may be updated based on the received model parameters and the corresponding decay factor. For example, the apparatus 10*i* may apply the received parameter updates Δθ$_{tj}$ to the model parameters θ$_i$ based on the corresponding decay factor. For example, the apparatus 10*i* may comprise a processor 12** and/or the like for applying the received parameter updates Δθ$_{tj}$ to the model parameters θ$_i$ based on the corresponding decay factor. For example, the received parameter update Δθ$_{tj}$ may be decayed and/or multiplied by the corresponding decay factor d$_{ij}$ and added to the model parameters θ$_i$. In an example embodiment, updating the model parameters may be described as $$\theta_i \leftarrow \theta_i + d_{ij} \sum_{t=T_{ij}}^{t_j} \Delta\theta_{ij}.$$

By applying the decay factor to the model parameter update, the effect of the divergence of the model resident on apparatus **10*i* from the model resident on model 10*j*** may be reduced or minimized.

At block 214, the synchronization metadata may be updated. For example the apparatus **10*i* may update the synchronization metadata. For example, the apparatus 10*i* may comprise a processor 12, memory 14, and/or the like for updating the synchronization metadata. For example, the iteration number for apparatus 10*i* at the last synchronization event with apparatus 10*j* T$_{ij}$ may be updated to reflect that a synchronization event with apparatus 10*j* has occurred. For example, the iteration number for apparatus 10*i* at the last synchronization event with apparatus 10*j*** T$_{ij}$ may be updated to be the current iteration number t$_i$.

In various embodiments, the communication session between apparatus **10*i* and 10*j* may be closed and/or terminated after apparatus 10*i* provided model updates and received model updates provided by apparatus 10*j*. In various embodiments, the apparatus 10*i* may synchronize with multiple other apparatuses at approximately the same time. For example, a synchronization event between apparatus 10*i* and apparatuses 10*j* and 10*k*** may occur at approximately the same time.

Missing Features

As noted above, apparatus 10A may be an apparatus disposed within a vehicle and in communication with one or more sensors of the vehicle. For example, apparatus 10A may comprise and/or be in communication with a location sensor (e.g., GPS sensor), an accelerometer, an accelerator pedal sensor, a brake pedal sensor, and/or the like. Apparatus 10C may be a cell phone and may comprise and/or be in communication with a location sensor (e.g., a GPS sensor), an accelerometer, and/or the like. However, the apparatus 10C may not be in communication with an accelerator pedal sensor and a brake pedal sensor of a vehicle. Thus, the model resident on apparatus 10C may not receive accelerator pedal or brake pedal data for training or as input for predicting results. Therefore, in various scenarios where apparatus **10*i*** has technical limitations (e.g., due to the availability of sensors, connectivity disruption, and/or the like) a masking matrix may be defined.

For example, apparatus 10C does not comprise or is not in communication with a sensor that relates to parameter l of a model. Apparatus 10C may then define a k-by-k-dimensional masking matrix M$_s$ where $$M_s = \left\{ m_{ij} \mid m_{ij} = \begin{cases} 1, & i=j, i \neq 1 \\ 0, & \text{otherwise} \end{cases} \right\}$$

and define W'$_C$ such that W'$_C$=W$_C$M$_S$. The linear scoring function f(x) may then be found by f(x)=W'$_C$x+b$_C$. If apparatus 10C did comprise sensors relating to all of the possible input/prediction features of the model, the masking matrix $M_S$ would be the identity matrix. When determining a determined model parameter update, the model parameter updates may be described as $$\Delta W = -\eta \left( \alpha \frac{\partial R(W)}{\partial W} + \frac{\partial L(y, WM_s x + b)}{\partial W} \right) M_s$$

and $$\Delta b = -\eta \left( \frac{\partial L(y, WM_s x + b)}{\partial W} \right).$$

When updating the model resident on apparatus 10C based on received model parameter updates, the model updates may also be multiplied by the masking matrix $M_S$ such that updating the model parameters based on a received model parameter update may be described as $$\theta_i \leftarrow \theta_i + d_{ij} \sum_{t=T_{ij}}^{t_j} \Delta M_S \theta_{ij}.$$

For example, the model coefficients for a predictive feature that apparatus 10C does not have access to will not affect the model predictions provided by the model resident on apparatus 10C.

III. Example Apparatus

The apparatus 10 (e.g., 10A, 10B, 10C, 10D) of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a smart phone, tablet, laptop, a personal digital assistant (PDA), a watch, a camera, a computer, server, a personal computer, a computer workstation, a laptop computer, a plurality of networked computing devices, and/or other device that can perform functions such as those described elsewhere herein. In this regard, FIG. 2 depicts an apparatus 10 (e.g., 10A, 10B, 10C, 10D) of an example embodiment that may be embodied by various computing devices including those identified above. As shown, the apparatus of an example embodiment may include, may be associated with or may otherwise be in communication with a processor 12, a memory device 14, one or more sensors 20, and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus 10 may be embodied as a chip or chip set. In other words, the apparatus 10 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 10 may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by a first apparatus, a model update based at least in part on synchronization metadata, wherein (a) the model update comprises one or more received model parameter updates, (b) each of the one or more received model parameter updates corresponds to one or more model parameters, and (c) the model update is associated with a second apparatus;
   determining, by the first apparatus, a decay factor based at least in part on the synchronization metadata;
   weighting the one or more received model parameter updates by applying, by the first apparatus, the decay factor to each of the one or more received model parameter updates;
   updating, by the first apparatus, the one or more model parameters based on the decayed model parameter updates;
   using, by the first apparatus, the one or more updated model parameters to determine a prediction; and
   performing, by the first apparatus, an action based on the determined prediction.

2. A method according to claim 1, further comprising:
   collecting one or more data points, the one or more data points based at least in part on measurements made by one or more sensors;
   determining one or more determined model parameter updates based at least in part on the one or more data points; and
   updating the one or more model parameters based at least in part on the one or more determined model parameter updates.

3. A method according to claim 2, wherein determining the one or more determined model parameter updates is based at least in part on a loss function, a regularization term, a learning rate function, or a combination thereof.

4. A method according to claim 2, wherein the one or more model parameters are updated by an element wise addition of one or more determined model parameter updates.

5. A method according to claim 1 wherein the synchronization metadata comprises information indicating a number of model update iterations completed by the second apparatus since a most recent previous model update associated with the second apparatus was received.

6. A method according to claim 1, wherein the decay factor applied to the received model parameter updates decreases monotonically as a number of model update iterations completed by the second apparatus since a most recent previous model update associated with the second apparatus was received increases.

7. A method according to claim 1, wherein the decay factor is parameterized by a decay constant.

8. A method according to claim 1, further comprising, providing one or more determined model updates to the second apparatus, the one or more determined model updates selected based on synchronization metadata indicating a model update iteration number for which a determined model update was last provided to the second apparatus.

9. A method according to claim 8, further comprising storing synchronization metadata indicating a most recent model update iteration number for which a determined model update has been provided to the second apparatus, the most recent model update iteration number being stored in association with an identifier configured to identify the second apparatus.

10. A method according to claim 1, wherein the one or more model parameters comprise one or more parameters of a predictive model.

11. A method according to claim 1, wherein the one or more model parameters comprise a default prediction.

12. A first apparatus comprising at least one processor and at least one memory storing computer program code, the at least one memory and the computer program code configured to, with the processor, cause the apparatus to at least:
- receive a model update based at least in part on synchronization metadata, wherein (a) the model update comprises one or more received model parameter updates, (b) each of the one or more received model parameter updates corresponds to one or more model parameters, and (c) the model update is associated with a particular second apparatus;
- determine a decay factor based at least in part on the synchronization metadata;
- weight the one or more received model parameter updates by applying the decay factor to the one or more received model parameter updates;
- update the one or more model parameters based on the decayed model parameter updates;
- use the one or more updated model parameters to determine a prediction; and
- perform an action based on the determined prediction.

13. A first apparatus according to claim 12, wherein the at least one memory and the computer program code are further configured to, with the processor, cause the apparatus to at least:
- collect one or more data points, the one or more data points based at least in part on measurements made by one or more sensors;
- determine one or more determined model parameter updates based at least in part on the one or more data points; and
- update the one or more model parameters based at least in part on the one or more determined model parameter updates.

14. A first apparatus according to claim 13, wherein the one or more model parameters are updated by an element wise addition of one or more determined model parameter updates.

15. A first apparatus according to claim 13, wherein determining the one or more determined model parameter updates is based at least in part on a loss function, a regularization term, a learning rate function, or a combination thereof.

16. A first apparatus according to claim 12, wherein the synchronization metadata comprises information indicating a number of model update iterations completed by the second apparatus since a most recent previous model update associated with the second apparatus was received.

17. A first apparatus according to claim 12, wherein the decay factor applied to the received model parameter updates decreases monotonically as a number of model update iterations completed by the second apparatus since a most recent previous model update associated with the second apparatus was received increases.

18. A first apparatus according to claim 12, wherein the at least one memory and the computer program code are further configured to, with the processor, cause the apparatus to at least provide one or more determined model updates to the second apparatus, the one or more determined model updates selected based on synchronization metadata indicating a model update iteration number for which a determined model update was last provided to the second apparatus.

19. A first apparatus according to claim 18, wherein the at least one memory and the computer program code are further configured to, with the processor, cause the apparatus to at least store synchronization metadata indicating a most recent model update iteration number for which a determined model update has been provided to the second apparatus, the most recent model update iteration number being stored in association with an identifier configured to identify the second apparatus.

20. A computer program product comprising at least one non-transitory computer-readable storage medium having computer-executable program code instructions stored therein, the computer-executable program code instructions comprising program code instructions configured to, when executed by a processor of a first apparatus, cause the first apparatus to at least:
- receive a model update based at least in part on synchronization metadata, wherein (a) the model update comprises one or more received model parameter updates, (b) each of the one or more received model parameter updates corresponds to one or more model parameters, and (c) the model update is associated with a second particular apparatus;
- determine a decay factor based at least in part on the synchronization metadata;
- weight the one or more received model parameter updates by applying the decay factor to the one or more received model parameter updates;
- update the one or more model parameters based on the decayed model parameter updates;
- use the one or more updated model parameters to determine a prediction; and
- perform an action based on the determined prediction.

* * * * *

UNITED STATES PATENT AND TRADEMARK OFFICE
CERTIFICATE OF CORRECTION

PATENT NO. : 10,380,503 B2
APPLICATION NO. : 15/094292
DATED : August 13, 2019
INVENTOR(S) : Tadej Stajner Page 1 of 1

It is certified that error appears in the above-identified patent and that said Letters Patent is hereby corrected as shown below:

On the Title Page

(71) Applicant: HERE Global B.V.,:
Delete "Veldhoven (NL)" and insert --Eindhoven (NL)--

In the Claims

Claim 12, Column 19, Line 15:
Delete "particular"

Signed and Sealed this
Twenty-ninth Day of October, 2019

Andrei Iancu
*Director of the United States Patent and Trademark Office*